(No Model.)

W. PATON.
MECHANISM FOR OPERATING THE VALVES OF FAUCETS, &c.

No. 368,849. Patented Aug. 23, 1887.

Witnesses:
L. Holmbog.
P. C. Dyrenforth.

Inventor
William Paton
by Price & Fisher
His Attorneys.

UNITED STATES PATENT OFFICE.

WILLIAM PATON, OF CHICAGO, ILLINOIS.

MECHANISM FOR OPERATING THE VALVES OF FAUCETS, &c.

SPECIFICATION forming part of Letters Patent No. 368,849, dated August 23, 1887.

Application filed October 7, 1884. Serial No. 144,898. (No model.)

*To all whom it may concern:*

Be it known that I, WILLIAM PATON, a citizen of the United States, residing at Chicago, in the county of Cook and State of Illinois, have invented certain new and useful Improvements in Mechanism for Operating the Valves of Faucets, Cocks, and Similar Devices, of which I do declare the following to be a full, clear, and exact description, reference being had to the accompanying drawings, forming part of this specification.

My present invention has relation to mechanism for operating valves, and particularly does it relate to the improvement of mechanism for operating the valves of faucets, cocks, gages, and similar devices of that class wherein a valve held within the barrel or body of the faucet or like device is to be moved toward and from its seat by a turning-spindle extending through said barrel or body.

The object of the invention is to provide a simple, cheap, durable, and effective means for operating such valves; and to this end it consists in certain novel features of construction hereinafter described, illustrated in the accompanying drawings, and particularly defined in the claims at the end of this specification.

Figure 1:
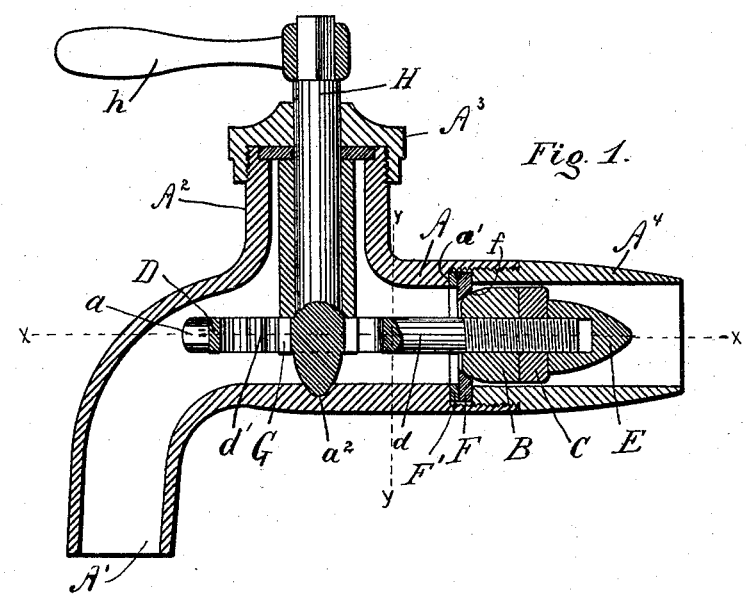
Figure 2:
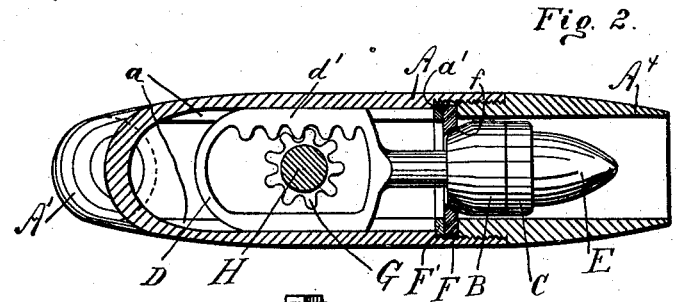
Figure 3:
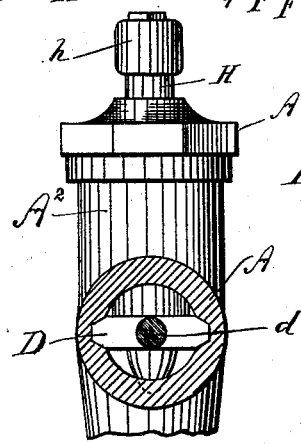

In the drawings, Figure 1 is a view in vertical longitudinal section of a faucet to which my invention is applied. Fig. 2 is a view in section on line $x\ x$ of Fig. 1. Fig. 3 is a view in cross-section on line $y\ y$, Fig. 1.

A designates the main barrel or body of the faucet, having the usual discharge-nozzle, A', and extension $A^2$, exteriorly threaded to receive the cap $A^3$. The rear portion of the barrel A is interiorly threaded to admit the threaded part of the detachable end piece, $A^4$. Within the barrel or body A fits the valve, its seat, and the rack and pinion for moving the valve toward and from its seat.

The valve and seat may be of any approved construction, a cone valve and seat being illustrated in the drawings. The valve B, preferably formed of rubber, is held against the threaded metal sleeve C, which is retained in place upon the threaded valve-stem $d$ by means of the conical nut E, that engages with the end of the valve-stem. Upon the stem $d$ is carried the annular valve-seat F, having the inclined face $f$, to admit the end of the valve, and behind the valve-seat is preferably placed a suitable rubber packing ring or washer, F'. At the end of the valve-stem $d$, and preferably formed integral therewith, is the open frame D, having upon the inner face of one of its sides the rack-bar $d'$. This frame D is of a size adapted to fit in a manner free to move longitudinally within the grooves $a$, formed diametrically opposite each other in the wall of the barrel A, and when the frame is in place within these grooves the valve-seat F will bear against the end $a'$ of the inner face of the barrel, which at such point is of smaller diameter than the valve-seat. Engaging with the rack $d'$ is the pinion G, carried by the turning-spindle H, the lower end of which is held in a seat, $a^2$, of the barrel, and the upper reduced end of which, passing through an opening in the cap A', is provided with a suitable handle, $h$. The open frame D, fitting within the grooves $a$ and around the pinion G, insures an accurate movement of the valve and a secure engagement of the rack and pinion.

From the foregoing description of parts their mode of operation is manifest. A movement in one direction of the handle $h$ on the end of the turning-spindle H serves to turn the pinion G, thus moving the rack $d'$ and bringing the valve B nearer its seat F, and thereby more or less obstructing the flow of liquid through the faucet. A reverse movement of the turning-spindle causes the rack and pinion to move the valve outward and open the faucet to its full capacity.

It will be readily understood that my invention, although illustrated as applied to but one form of faucet, is equally applicable to a great variety of faucets, cocks, gages, and similar devices wherein a valve is to be advanced to and withdrawn from its seat.

I am aware that it has been heretofore proposed to operate the valve of the faucet by means of a rack-bar and pinion, and I do not wish to be understood, therefore, as broadly claiming such construction.

I am well aware of the construction set forth in the patent of Shedlock and Marshall, February 22, 1866, and do not wish to be understood as making claim to any features of the invention there shown.

Having thus described my invention, what I claim as new, and desire to secure by Letters Patent, is—

1. In a faucet, the combination, with the barrel or body having its interior wall grooved longitudinally at a distance back of the valve-seat, of a valve having connected thereto a rack-bar the back whereof fits within the groove of the wall and is guided thereby, a pinion for operating said rack-bar, and a spindle for turning the pinion, said several parts being relatively arranged substantially as described.

2. In a faucet, the combination of the barrel or body having its inner wall provided with a suitable valve-seat and with longitudinal grooves $a$ opposite each other, the open frame D, adapted to fit within said grooves and provided with a rack-bar, $d'$, on the inner face of one of its sides, the pinion G, passing through said open frame and gearing with the rack-bar, the spindle for said pinion, and the valve and valve-stem, substantially as described.

WILLIAM PATON.

Witnesses:
   GEO. P. FISHER, Jr.,
   L. HOLMBOE.